United States Patent
Zhang

(10) Patent No.: US 12,375,419 B2
(45) Date of Patent: Jul. 29, 2025

(54) HQOS QUEUE SCHEDULING METHOD, APPARATUS, AND SYSTEM

(71) Applicant: HUAWEI TECHNOLOGIES CO., LTD., Shenzhen (CN)

(72) Inventor: Xiongwei Zhang, Beijing (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 313 days.

(21) Appl. No.: 18/155,565

(22) Filed: Jan. 17, 2023

(65) Prior Publication Data

US 2023/0155954 A1    May 18, 2023

Related U.S. Application Data

(63) Continuation of application No. PCT/CN2021/098028, filed on Jun. 3, 2021.

(30) Foreign Application Priority Data

Jul. 16, 2020 (CN) .......................... 202010685543.7

(51) Int. Cl.
*H04L 12/28* (2006.01)
*H04L 47/215* (2022.01)
*H04L 47/6295* (2022.01)

(52) U.S. Cl.
CPC ........ *H04L 47/6295* (2013.01); *H04L 47/215* (2013.01)

(58) Field of Classification Search
CPC .... H04L 47/6295; H04L 47/215; H04L 47/22
See application file for complete search history.

(56) References Cited

U.S. PATENT DOCUMENTS

| 7,760,747 B2 * | 7/2010 | Dally | H04L 47/58 370/428 |
| 8,619,787 B2 * | 12/2013 | Sonnier | H04L 49/101 370/395.4 |
| 10,554,570 B2 * | 2/2020 | Xiao | H04L 45/38 |

(Continued)

FOREIGN PATENT DOCUMENTS

| CN | 101667974 A | 3/2010 |
| CN | 106330710 A | 1/2017 |
| WO | 2014173367 A2 | 10/2014 |

*Primary Examiner* — Abdelnabi O Musa
(74) *Attorney, Agent, or Firm* — Leydig, Voit & Mayer, Ltd.

(57) ABSTRACT

A queue scheduling method, apparatus, and system are provided, to flexibly manage a queue, meet an actual transmission requirement, and reduce resources. The queue scheduling method implemented by a processing apparatus includes: generating an HQoS scheduling tree including a plurality of leaf nodes, each of which identifies a queue on a traffic management (TM) hardware entity including a plurality of queues; obtaining traffic characteristics of the plurality of queues based on the plurality of leaf nodes; determining a scheduling parameter of at least one queue in the plurality of queues based on the traffic characteristics which are of data flows transmitted by the plurality of queues; sending to a scheduling apparatus a scheduling message corresponding to the at least one queue in the TM hardware entity, including the scheduling parameter of the at least one queue used to schedule the at least one queue.

20 Claims, 7 Drawing Sheets

(56) References Cited

U.S. PATENT DOCUMENTS

| | | | | |
|---|---|---|---|---|
| 12,184,554 B2* | 12/2024 | Zhu | ......................... | H04L 47/24 |
| 2012/0020210 A1* | 1/2012 | Sonnier | ................ | H04L 47/621 |
| | | | | 370/230.1 |
| 2016/0191406 A1* | 6/2016 | Xiao | ................... | H04L 12/6418 |
| | | | | 370/235 |
| 2020/0220817 A1* | 7/2020 | Svanberg | ................ | H04L 47/22 |
| 2020/0336435 A1* | 10/2020 | Zhang | .................... | H04L 67/61 |
| 2023/0117851 A1* | 4/2023 | Chen | ................. | H04L 47/6225 |
| | | | | 709/224 |

* cited by examiner

HQOS QUEUE SCHEDULING METHOD, APPARATUS, AND SYSTEM

CROSS-REFERENCE TO RELATED APPLICATIONS

This application is a continuation of International Application No. PCT/CN2021/098028, filed on Jun. 3, 2021, which claims priority to Chinese Patent Application No. 202010685543.7, filed on Jul. 16, 2020. The disclosures of the aforementioned applications are hereby incorporated by reference in their entireties.

TECHNICAL FIELD

Embodiments of this application relate to the communication field, and in particular, to a queue scheduling method, apparatus, and system.

BACKGROUND

Currently, with rapid development of computer networks, voice, images, and important data sensitive to bandwidth, delay, and jitter are increasingly transmitted over the networks. To provide different promises and guarantees for data transmission performance, a quality of service (QoS) technology is widely used to ensure network transmission quality. With expansion of user scale and increase in service types, Ethernet devices are required to further differentiate service traffic, and perform uniform management and hierarchical scheduling on data flows of hierarchies such as a plurality of users and services. Therefore, a hierarchical quality of service (HQoS) technology emerges as the times require. In the HQoS technology, scheduling policies are assembled into a hierarchical tree structure (referred to as an "HQoS scheduling tree" for short below), and queues transmitting different data flows are scheduled by using the HQoS scheduling tree.

In the conventional technology, the HQoS scheduling tree is implemented by a traffic management (TM) hardware entity. In this manner, a mapping relationship between hierarchies is fixed. As a result, flexible management cannot be implemented, an actual transmission requirement cannot be met, and resources are wasted.

SUMMARY

Embodiments of this application provide a queue scheduling method, apparatus, and system, to flexibly manage a queue, meet an actual transmission requirement, and reduce resources.

According to a first aspect, a queue scheduling method is provided. The method may be performed by a processing apparatus. The processing apparatus may be a central processing unit (CPU), a network processor (NP), or the like. The method includes the following steps: The processing apparatus generates an HQoS scheduling tree, where the HQoS scheduling tree is used to describe a tree structure of a node participating in scheduling in a communication network, the HQoS scheduling tree includes a plurality of leaf nodes, and each of the plurality of leaf nodes is used to identify a queue on a TM hardware entity. The TM hardware entity includes a plurality of queues, and the plurality of leaf nodes and the plurality of queues are in a one-to-one correspondence. After generating the HQoS scheduling tree, the processing apparatus may obtain traffic characteristics of the plurality of queues based on the plurality of leaf nodes and determine a scheduling parameter of at least one queue in the plurality of queues based on the traffic characteristics of the plurality of queues, where the traffic characteristics of the plurality of queues are traffic characteristics of data flows transmitted by the plurality of queues. In addition, the processing apparatus sends a scheduling message to a scheduling apparatus corresponding to the at least one queue in the TM hardware entity, where the scheduling message includes the scheduling parameter of the at least one queue, and the scheduling parameter is used to schedule the at least one queue. A difference from the conventional technology lies in that the HQoS scheduling tree is implemented by software, and a queue can be flexibly managed, an actual transmission requirement can be met, and scheduling resources can be reduced on the premise that a TM hardware entity does not need to be replaced.

Optionally, the HQoS scheduling tree further includes a root node of the plurality of leaf nodes. Correspondingly, that the processing apparatus determines a scheduling parameter of at least one queue in the plurality of queues based on the traffic characteristics of the plurality of queues may be: The processing apparatus determines the scheduling parameter of the at least one queue in the plurality of queues based on the traffic characteristics of the plurality of queues and a scheduling parameter of the root node. Because the HQoS scheduling tree is implemented by software, a mapping relationship between the root node and the leaf node may be changed, and the TM hardware entity does not need to be replaced, to flexibly manage the queue.

Optionally, the HQoS scheduling tree further includes a root node and at least one branch node corresponding to the root node, each of the at least one branch node corresponds to one or more leaf nodes, and different branch nodes correspond to different leaf nodes. Correspondingly, that the processing apparatus determines a scheduling parameter of at least one queue in the plurality of queues based on the traffic characteristics of the plurality of queues may be: The processing apparatus determines a traffic characteristic of the at least one branch node based on the traffic characteristics of the plurality of queues, determines a scheduling parameter of the at least one branch node based on the traffic characteristic of the at least one branch node and a scheduling parameter of the root node, and determines the scheduling parameter of the at least one queue in the plurality of queues based on the traffic characteristics of the plurality of queues and the scheduling parameter of the at least one branch node. Because the HQoS scheduling tree is implemented by software, a mapping relationship between the root node, the branch node, and the leaf node may be changed, and the TM hardware entity does not need to be replaced, to flexibly manage the queue.

Optionally, the traffic characteristic includes an input rate and a queue identifier. Correspondingly, that the processing apparatus determines a scheduling parameter of at least one queue in the plurality of queues based on the traffic characteristics of the plurality of queues may be: The processing apparatus determines characteristic parameters of the plurality of queues based on the queue identifiers of the plurality of queues, and determines the scheduling parameter of the at least one queue in the plurality of queues based on the input rates and the characteristic parameters of the plurality of queues, where the characteristic parameter includes at least one of a priority and a weight.

Optionally, the scheduling apparatus is a token bucket, and the scheduling parameter is a rate at which the token bucket outputs a token.

Optionally, the TM hardware entity is an application-specific integrated circuit ASIC chip or a programmable logical controller PLC.

Optionally, the processing apparatus and the TM hardware entity belong to a same network device. The network device may be a router, a switch, a base station, or the like.

According to a second aspect, a queue scheduling method is provided. The method is applied to a scheduling apparatus of a TM hardware entity, the TM hardware entity further includes a plurality of queues, and the method includes the following steps: The scheduling apparatus receives a scheduling message from a processing apparatus, where the scheduling message includes a scheduling parameter of at least one queue in the plurality of queues, and the TM hardware entity does not include the processing apparatus. The scheduling apparatus schedules the at least one queue based on the scheduling parameter of the at least one queue. Because the scheduling apparatus schedules the queue based on the scheduling message of the processing apparatus that does not belong to the TM hardware entity, when the scheduling parameter of the queue in the scheduling message changes, the TM hardware entity does not need to be replaced, to flexibly manage the queue, meet an actual transmission requirement, and reduce resources.

Optionally, the processing apparatus and the TM hardware entity belong to a same network device.

According to a third aspect, a processing apparatus is provided. The apparatus includes: a generation unit, configured to generate a hierarchical quality of service HQoS scheduling tree, where the HQoS scheduling tree is used to describe a tree structure of a node participating in scheduling in a communication network, the HQoS scheduling tree includes a plurality of leaf nodes, each of the plurality of leaf nodes is used to identify a queue on a traffic management TM hardware entity, the TM hardware entity includes a plurality of queues, and the plurality of leaf nodes and the plurality of queues are in a one-to-one correspondence; an obtaining unit, configured to obtain traffic characteristics of the plurality of queues based on the plurality of leaf nodes; a determining unit, configured to determine a scheduling parameter of at least one queue in the plurality of queues based on the traffic characteristics of the plurality of queues, where the traffic characteristics of the plurality of queues are traffic characteristics of data flows transmitted by the plurality of queues; and a sending unit, configured to send a scheduling message to a scheduling apparatus corresponding to the at least one queue in the TM hardware entity, where the scheduling message includes the scheduling parameter of the at least one queue, and the scheduling parameter is used to schedule the at least one queue.

Optionally, the HQoS scheduling tree further includes a root node of the plurality of leaf nodes.

The determining unit is configured to determine the scheduling parameter of the at least one queue in the plurality of queues based on the traffic characteristics of the plurality of queues and a scheduling parameter of the root node.

Optionally, the HQoS scheduling tree further includes a root node and at least one branch node corresponding to the root node, each of the at least one branch node corresponds to one or more leaf nodes, and different branch nodes correspond to different leaf nodes.

The determining unit is configured to: determine a traffic characteristic of the at least one branch node based on the traffic characteristics of the plurality of queues; determine a scheduling parameter of the at least one branch node based on the traffic characteristic of the at least one branch node and a scheduling parameter of the root node; and determine the scheduling parameter of the at least one queue in the plurality of queues based on the traffic characteristics of the plurality of queues and the scheduling parameter of the at least one branch node.

Optionally, the traffic characteristic includes an input rate and a queue identifier.

The determining unit is configured to: determine characteristic parameters of the plurality of queues based on the queue identifiers of the plurality of queues; and determine the scheduling parameter of the at least one queue in the plurality of queues based on the input rates and the characteristic parameters of the plurality of queues, where the characteristic parameter includes at least one of a priority and a weight.

Optionally, the scheduling apparatus is a token bucket, and the scheduling parameter is a rate at which the token bucket outputs a token.

Optionally, the TM hardware entity is an application-specific integrated circuit ASIC chip or a programmable logical controller PLC.

Optionally, the processing apparatus and the TM hardware entity belong to a same network device.

According to a fourth aspect, a scheduling apparatus is provided. The apparatus belongs to a TM hardware entity, the traffic management TM hardware entity further includes a plurality of queues, and the scheduling apparatus includes: a receiving unit, configured to receive a scheduling message from a processing apparatus, where the scheduling message includes a scheduling parameter of at least one queue in the plurality of queues, and the TM hardware entity does not include the processing apparatus; and a scheduling unit, configured to schedule the at least one queue based on the scheduling parameter of the at least one queue.

Optionally, the processing apparatus and the TM hardware entity belong to a same network device.

According to a fifth aspect, a queue scheduling system is provided. The queue scheduling system includes the processing apparatus according to the third aspect and the scheduling apparatus according to the fourth aspect.

According to a sixth aspect, a computer-readable storage medium is provided. The computer-readable storage medium includes instructions. When the instructions are run on a computer, the computer is enabled to perform the queue scheduling method according to the first aspect or the queue scheduling method according to the second aspect.

DESCRIPTION OF EMBODIMENTS

In embodiments of this application, the HQoS scheduling tree is used to describe a tree structure of a node participating in scheduling in a communication network. The tree structure includes at least a plurality of leaf nodes and a root node to which the plurality of leaf nodes belong. Optionally, the tree structure further includes a branch node.

The leaf node is a node on a bottom layer of the HQoS scheduling tree, and one leaf node is used to identify one queue. The root node is a node on a top layer of the HQoS scheduling tree. The branch node is a node on a middle layer of the HQoS scheduling tree and is between the root node and the leaf node. One HQoS scheduling tree may include one or more layers of branch nodes, and each branch node corresponds to one or more leaf nodes.

One queue is used to transmit one data flow, queues corresponding to a same branch node may transmit data flows having a same attribute, for example, data flows of a same user group, a same user, a same service, or the like.

Figure 1:
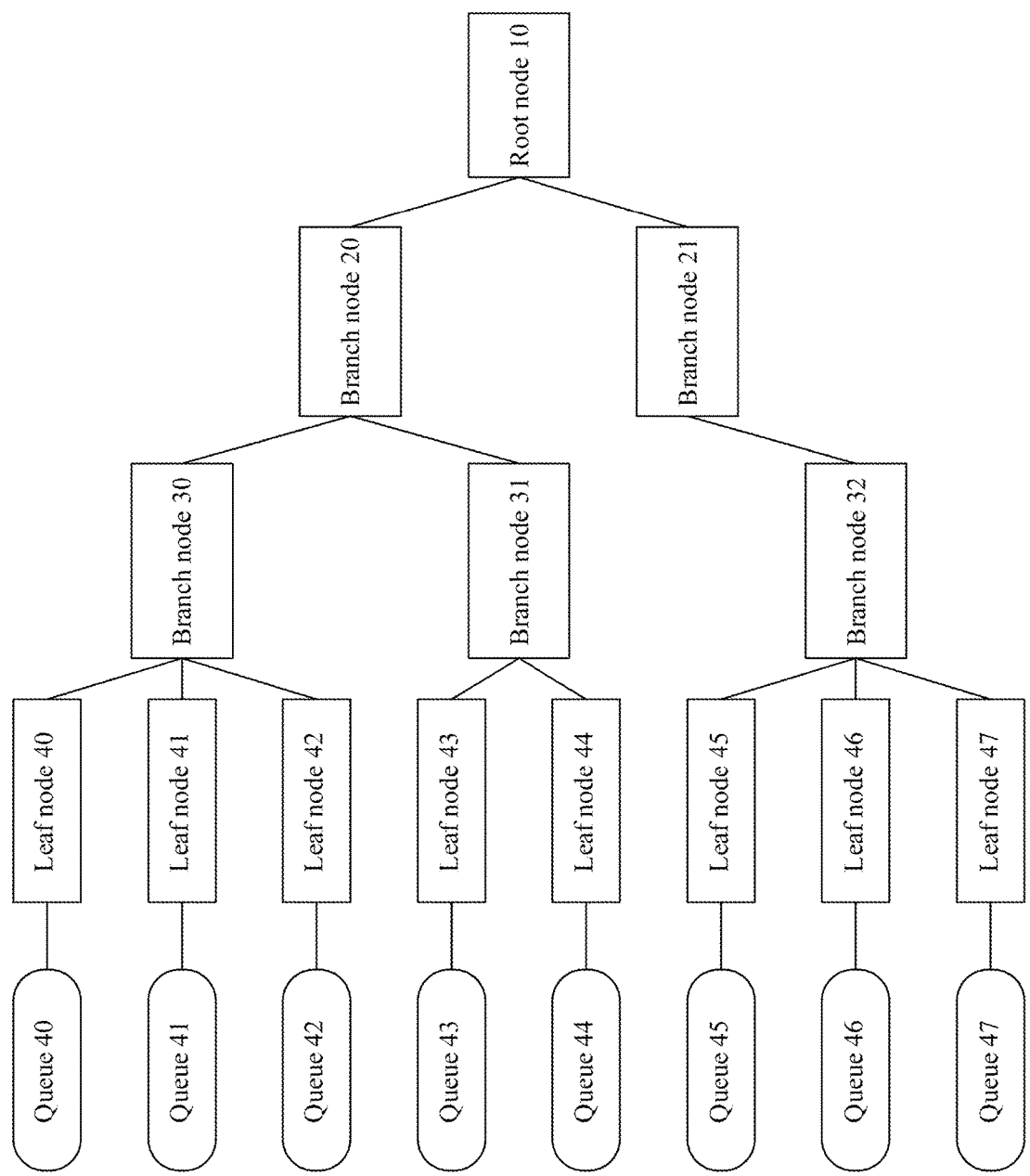
FIG. 1 is a schematic diagram of an HQoS scheduling tree according to an embodiment of this application.

For example, with reference to FIG. 1, an HQoS scheduling tree includes a four-layer tree structure. A top layer of the tree structure is a root node 10, a second layer includes a branch node 20 and a branch node 21, a third layer includes a branch node 30, a branch node 31, and a branch node 32, and a fourth layer includes a leaf node 40, a leaf node 41, a leaf node 42, a leaf node 43, a leaf node 44, a leaf node 45, a leaf node 46, and a leaf node 47. The eight leaf nodes each identify one queue, that is, identify eight queues in total, to transmit eight data flows.

The branch node 20 is an upper-layer branch node of the branch node 30 and the branch node 31. The branch node 20 is used to identify a data flow of a user group 1, the branch node 30 is used to identify a data flow of a user 1 belonging to the user group 1, and the branch node 31 is used to identify a data flow of a user 2 belonging to the user group 1.

The branch node 30 is an upper-layer branch node of the leaf node 40, the leaf node 41, and the leaf node 42. The leaf node 40 is used to identify a data flow of a service 1 of the user 1, the leaf node 41 is used to identify a data flow of a service 2 of the user 1, and the leaf node 42 is used to identify a data flow of a service 3 of the user 1.

The branch node 31 is an upper-layer branch node of the leaf node 43 and the leaf node 44. The leaf node 43 is used to identify a data flow of a service 1 of the user 2, and the leaf node 44 is used to identify a data flow of a service 4 of the user 2.

The branch node 21 is an upper-layer branch node of the branch node 32. The branch node 21 is used to identify a data flow of a user group 2, and the branch node 32 is used to identify a data flow of a user 3 belonging to the user group 2. The branch node 32 is an upper-layer branch node of the leaf node 45, the leaf node 46, and the leaf node 47. The leaf node 45 is used to identify a data flow of a service 1 of the user 3, the leaf node 46 is used to identify a data flow of a service 2 of the user 3, and the leaf node 47 is used to identify a data flow of a service 5 of the user 3.

In a conventional HQoS technology, an HQoS scheduling tree is implemented by a TM hardware entity. The TM hardware entity includes a queue and a scheduler. A branch node and a root node each have a corresponding scheduler. The scheduler corresponding to the root node is used to schedule the scheduler of the branch node, and the scheduler of the branch node is used to schedule a queue corresponding to a leaf node. A mapping relationship between schedulers on layers and a mapping relationship between schedulers and queues are fixed because the mapping relationships are implemented through hardware connection. Consequently, the queues cannot be flexibly managed. If a mapping relationship between layers is to be changed, the TM hardware entity needs to be replaced. Besides, if a requirement of a branch node or a root node on a quantity of queues declines, an unused queue causes waste of resources.

For example, a scheduler corresponding to the root node 10 is used to schedule a scheduler of the branch node 20 and a scheduler of the branch node 21. The scheduler of the branch node 20 is used to schedule a scheduler of the branch node 30 and a scheduler of the branch node 31, and the scheduler of the branch node 21 is used to schedule a scheduler of the branch node 32. The scheduler of the branch node 30 is used to schedule queues respectively corresponding to the leaf node 40, the leaf node 41, and the leaf node 42, the scheduler of the branch node 31 is used to schedule queues respectively corresponding to the leaf node 43 and the leaf node 44, and the branch node 32 is used to schedule queues respectively corresponding to the leaf node 45, the leaf node 46, and the leaf node 47. In other words, objects scheduled by the schedulers are fixed and cannot be flexibly changed, if the objects are to be changed, the TM hardware entity needs to be replaced. Assuming that the queue corresponding to the leaf node 40 has no data flow, and the queue corresponding to the leaf node 43 has many data flows, according to the conventional technology, the queue corresponding to the leaf node 40 cannot be released from the scheduler corresponding to the branch node 30 and be scheduled and used by the scheduler corresponding to the branch node 31. Therefore, an actual transmission requirement cannot be met, and waste of resources is caused to some degree.

To solve the technical problem, an embodiment of this application provides a queue scheduling method. A main idea of the queue scheduling method is that an HQoS scheduling tree is implemented by software, and a TM hardware entity includes only a plurality of queues and a scheduling apparatus corresponding to each queue. The scheduling apparatus is, for example, a token bucket. Because in this embodiment of this application, a mapping relationship between layers is set on a software level, the mapping relationship between layers can be changed, to flexibly manage the queue, meet an actual transmission requirement, and reduce waste of resources.

Figure 2:
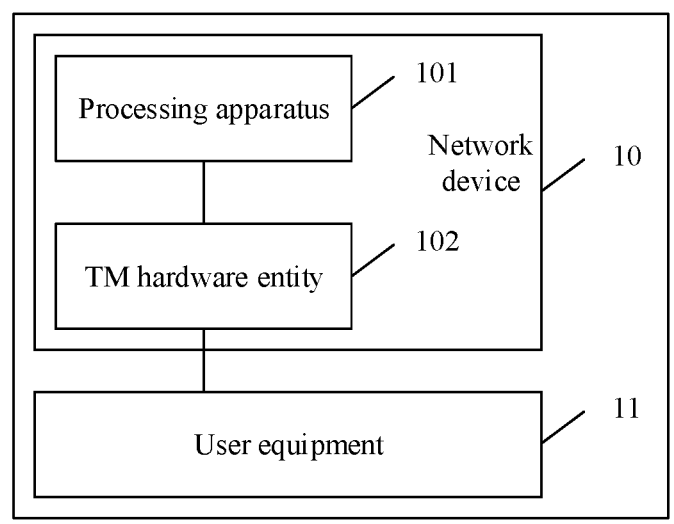
FIG. 2 is a schematic diagram of a queue scheduling system according to an embodiment of this application.

FIG. 2 is a schematic diagram of a hardware scenario to which a queue scheduling method may be applied. In other words, the queue scheduling method may be applied to a queue scheduling system. The system includes a network device 10 and a device 11.

For example, the network device 10 may be a router, a switch, a base station, or the like. When the network device 10 is a router or a switch, the network device 10 may be any network device of an access network, an aggregation network or a core network. When the network device 10 is a device of an access network, the network device 10 is, for example, a broadband access server (broadband remote access server, BRAS), a digital subscriber line access multiplexer (DSLAM), or the like.

In FIG. 2, the network device 10 includes a processing apparatus 101 and a TM hardware entity 102.

The processing apparatus 101 may be a central processing unit (CPU), a network processor (NP), or the like.

The TM hardware entity 102 may be an application-specific integrated circuit (ASIC) chip, a programmable logic controller (PLC), or the like. This is not specifically limited in this embodiment of this application.

The TM hardware entity 102 includes a plurality of queues and a scheduling apparatus corresponding to each queue. The scheduling apparatus is, for example, a token bucket. The TM hardware entity 102 may determine, based on a rate at which the token bucket outputs a token, a rate at which a corresponding queue outputs a data flow.

It should be noted that in FIG. 2, the processing apparatus 101 and the TM hardware entity 102 are integrated in a same network device (namely, the network device 10). In some other application scenarios, the TM hardware entity 102 may exist in a manner of being independent of a network device including the processing apparatus 101.

The device 11 may be a server or a terminal device. The terminal device may be, for example, a mobile phone, a tablet computer, a personal computer (PC), or a multimedia playback device. The network device 10 and the device 11 communicate with each other by using a network. The network may be an operator network or may be a local area network.

The network device 10 receives a data flow from the device 11 through a communication interface and transmits the data flow to a queue. The processing apparatus 101 of the network device 10 determines a scheduling parameter of the queue based on a traffic characteristic of the queue and sends a scheduling message to the TM hardware entity 102. The scheduling message includes the scheduling parameter, the scheduling parameter is used by the TM hardware entity 102 to schedule the queue, so that a data flow corresponding to the corresponding queue is dequeued at a rate corresponding to the scheduling parameter, and the data flow is sent through a communication interface to a next-hop network device.

The embodiments of this application provide a queue scheduling method and apparatus, to flexibly manage a mapping relationship between layers of the HQoS scheduling tree and reduce scheduling resources.

Figure 3:
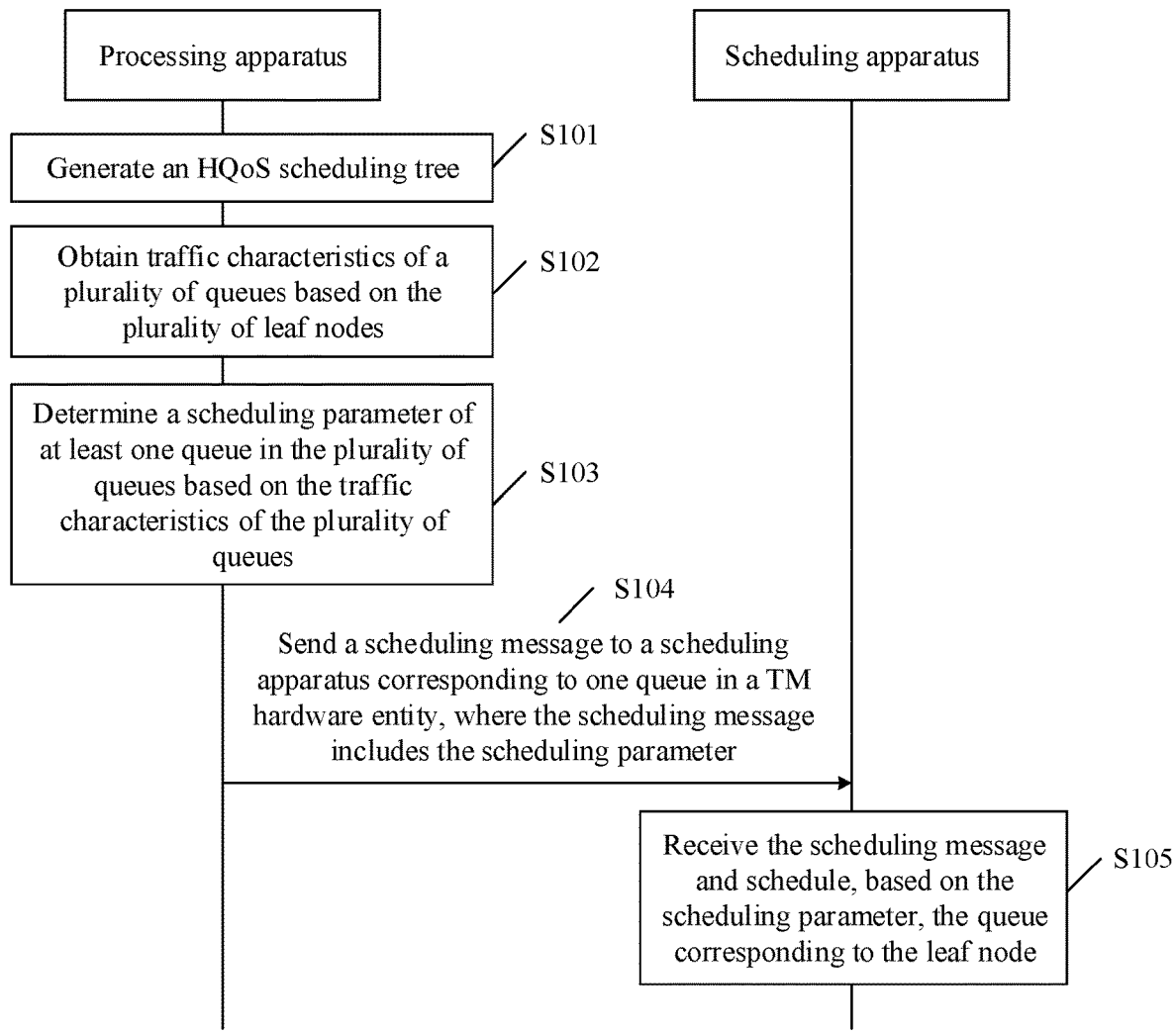
FIG. 3 is a schematic flowchart of a queue scheduling method according to an embodiment of this application.

FIG. 3 is a schematic flowchart of a queue scheduling method according to an embodiment of this application.

The queue scheduling method provided in this embodiment of this application includes the following steps.

S101: A processing apparatus generates an HQoS scheduling tree.

In this embodiment of this application, the processing apparatus may be the processing apparatus 101 in the system shown in FIG. 2. In this embodiment of this application, the processing apparatus pre-generates the HQoS scheduling tree. A difference from the conventional technology lies in that the HQoS scheduling tree is implemented by software. In other words, a root node and a leaf node included in the HQoS scheduling tree are implemented by software code. The leaf node may be represented by an identifier of a corresponding queue on a TM hardware entity (for example, the TM hardware entity 102 shown in FIG. 2), and the root node may be represented by an identifier of the root node. Optionally, the HQoS scheduling tree may further include one or more layers of branch nodes. Each branch node may be represented by an identifier of the corresponding branch node.

In other words, the HQoS scheduling tree may be represented by a mapping relationship between identifiers of nodes. Using FIG. 1 as an example, the HQoS scheduling tree may be represented by a set of the following mapping relationships:

a mapping relationship between an identifier of a root node 10 and an identifier of a branch node 20 and a mapping relationship between the identifier of the root node 10 and an identifier of a branch node 21;

a mapping relationship between the identifier of the branch node 20 and an identifier of a branch node 30 and a mapping relationship between the identifier of the branch node 20 and an identifier of a branch node 31;

a mapping relationship between the identifier of the branch node 21 and an identifier of a branch node 32;

a mapping relationship between the identifier of the branch node 30 and an identifier of a queue 40, a mapping relationship between the identifier of the branch node 30 and an identifier of a queue 41, and a mapping relationship between the identifier of the branch node 30 and an identifier of a queue 42;

a mapping relationship between the identifier of the branch node 31 and an identifier of a queue 43 and a mapping relationship between the identifier of the branch node 31 and an identifier of a queue 44; and a mapping relationship between the identifier of the branch node 32 and an identifier of a queue 45, a mapping relationship between the identifier of the branch node 32 and an identifier of a queue 46, and a mapping relationship between the identifier of the branch node 32 and an identifier of a queue 47.

Because the HQoS scheduling tree may be expressed by mapping relationships between nodes on layers, the HQoS scheduling tree may be obtained through configuration or be obtained through delivery by a network management system (NMS) communicating with the processing apparatus. A network management device may be a controller, a terminal device, or the like.

After generating the HQoS scheduling tree, the processing apparatus may continue to perform the following S102 to S104. It may be understood that the step S101 does not need to be performed once every time before S102 to S104 are performed. The processing apparatus may repeatedly perform S102 to S104 after S101 is performed once.

S102: The processing apparatus obtains traffic characteristics of a plurality of queues based on a plurality of leaf nodes.

In this embodiment of this application, the leaf nodes and the queues have a mapping relationship. Optionally, the leaf node may be represented by an identifier of the corresponding queue.

In this embodiment of this application, the traffic characteristic of the queue is a traffic characteristic of a data flow transmitted by the queue, for example, includes an input rate and a queue identifier of the data flow corresponding to the queue.

S103: The processing apparatus determines a scheduling parameter of at least one queue in the plurality of queues based on the traffic characteristics of the plurality of queues.

In this embodiment of this application, the scheduling parameter of the queue is a parameter used to schedule the queue. For example, when the scheduling apparatus is a token bucket, the scheduling parameter of the queue is a rate at which the token bucket outputs a token. The rate at which the token bucket outputs the token is a key factor of the output rate of the data flow transmitted by the queue. Therefore, the rate at which the queue outputs the data flow can be determined by determining the rate at which the token bucket outputs the token, to schedule the queue.

Specifically, that the processing apparatus determines a scheduling parameter of at least one queue in the plurality of queues based on the traffic characteristics of the plurality of queues may be: The processing apparatus determines characteristic parameters of the plurality of queues based on the queue identifiers of the plurality of queues, and determines the scheduling parameter of the at least one queue in the plurality of queues based on the input rates and the characteristic parameters of the plurality of queues.

The characteristic parameter of the queue may be at least one of a priority and a weight of the queue. When the plurality of queues all have corresponding data flows, a higher priority of one queue indicates an earlier moment at which the queue outputs a data flow. A queue with a high priority preferentially outputs a data flow. The reverse is also true.

In some embodiments, a queue identifier can represent a priority of a queue. For example, a smaller queue identifier indicates a higher priority of the queue. Using FIG. 1 as an example, among the queue 40, the queue 41, and the queue 42, the queue 40 has a highest priority, the queue 41 has a second highest priority, and the queue 42 has a lowest priority.

In some other embodiments, a queue identifier does not represent a priority of a queue. In this case, the processing apparatus may prestore a correspondence between the queue identifier and the priority of the queue, and obtain the priority of the queue based on the queue identifier and the correspondence.

Table 1 shows a correspondence between the queue identifier and the priority of the queue. It can be seen from Table 1 that a priority of the queue 43 is higher than a priority of the queue 44. It indicates that a bandwidth resource is preferentially allocated to the queue 43, and a remaining bandwidth resource is allocated to the queue 44. The bandwidth resource may be a bandwidth resource corresponding to the branch node 30.

TABLE 1

| Queue identifier | Priority of a queue |
| --- | --- |
| Queue 43 | High |
| Queue 44 | Low |

The weight represents a ratio of the rate at which the queue outputs a data flow to a total bandwidth. A higher priority indicates a higher ratio of the rate at which the queue outputs a data flow to the total bandwidth. A lower priority indicates a lower ratio of the rate at which the queue outputs a data flow to the total bandwidth.

In this embodiment of this application, the processing apparatus may prestore the correspondence between the queue identifier and the weight of the queue. In this way, the weight corresponding to the queue can be obtained based on the queue identifier and the correspondence.

Table 2 shows a correspondence between the queue identifier and the weight of the queue. It can be learned from Table 2 that a rate at which the queue 45 outputs a data flow may take up 40% of the total bandwidth, a rate at which the queue 46 outputs a data flow may take up 35% of the total bandwidth, and a rate at which the queue 47 outputs a data flow may take up 25% of the total bandwidth. The total bandwidth is a bandwidth corresponding to the branch node 32.

TABLE 2

| Queue identifier | Weight of a queue |
| --- | --- |
| Queue 45 | 40% |
| Queue 46 | 35% |
| Queue 47 | 25% |

Table 1 and Table 2 show a case in which the characteristic parameter of the queue includes only the priority of the queue or the weight of the queue. As mentioned above, the characteristic parameter of the queue may alternatively include both the priority of the queue and the weight of the queue.

Table 3 shows a correspondence between the queue identifier, the priority of the queue, and the weight of the queue. It can be seen from Table 3 that a priority of the queue 40 is higher than a priority of the queue 41 and a priority of the queue 42. Therefore, a bandwidth resource may be preferentially allocated to the queue 40, 40% of a remaining bandwidth resource is allocated to the queue 41, and 60% of the remaining bandwidth resource is allocated to the queue 42. The bandwidth resource may be the bandwidth resource corresponding to the branch node 30.

TABLE 3

| Queue identifier | Priority of a queue | Weight of a queue |
| --- | --- | --- |
| Queue 40 | High | |
| Queue 41 | Low | 40% |
| Queue 42 | | 60% |

In this embodiment of this application, if the HQoS scheduling tree includes only the root node and the leaf node, the processing apparatus may determine the scheduling parameter of the at least one queue in the plurality of queues based on the traffic characteristics of the plurality of queues and a scheduling parameter of the root node.

Specifically, after obtaining the traffic characteristics of the plurality of queues, the processing apparatus may obtain the identifier of the root node based on the queue identifiers of the plurality of queues and mapping relationships. The mapping relationships are mapping relationships between the queue identifiers of the plurality of queues and the identifier of the root node. Then, the processing apparatus obtains the scheduling parameter of the root node based on the identifier of the root node, and determines the scheduling parameter of the at least one queue in the plurality of queues based on the traffic characteristics of the plurality of queues and the scheduling parameter of the root node. In addition, the processing apparatus may pre-establish a mapping relationship between the identifier of the root node and the scheduling parameter of the root node.

The scheduling parameter of the root node may be obtained through configuration, and may be determined based on a total bandwidth of an interface corresponding to the root node during configuration. It should be noted that the scheduling parameter of the root node may be an output rate of a "virtual token bucket" corresponding to the root node. The token bucket is "virtual" because the TM hardware entity does not include a token bucket corresponding to the root node. The TM hardware entity includes only a token bucket corresponding to the leaf node. In other words, one leaf node corresponds to one token bucket. For ease of understanding and calculation, the scheduling parameter of the root node in this embodiment of this application may be regarded as an output rate of the "virtual token bucket" of the root node.

For example, assuming that the total bandwidth of the interface corresponding to the root node is 100 G, the output rate of the "virtual token bucket" corresponding to the root node may be 100 Gbps. It is assumed that the root node corresponds to two leaf nodes, respectively corresponding to a queue 1 and a queue 2. An input rate of the queue 1 is 70 Gbps, an input rate of the queue 2 is 50 Gbps, and a priority of the queue 1 is higher than a priority of the queue 2. Therefore, the processing apparatus may determine that an output rate of the queue 1 is 70 Gbps, and an output rate of the queue 2 is 30 Gbps.

For another example, assuming that the total bandwidth of the interface corresponding to the root node is 100 G, the output rate of the "virtual token bucket" corresponding to the root node may be 100 Gbps. It is assumed that the root node corresponds to two leaf nodes, respectively corresponding to a queue 1 and a queue 2. An input rate of the queue 1 is 70 Gbps, an input rate of the queue 2 is 30 Gbps, a weight of the queue 1 is 0.6, and a weight of the queue 2 is 0.4. Therefore, the processing apparatus may determine that a theoretical output rate of the queue 1 is 60 Gbps, and a theoretical output rate of the queue 2 is 40 Gbps. However, because the input rate of the queue 2 is less than the theoretical output rate, the input rate of the queue 2 is used as an actual output rate, that is, 30 Gbps. To avoid waste of bandwidth, the actual output rate of the queue 1 may be greater than the theoretical output rate of the queue 1, and is, for example, 70 (100-30) Gbps.

If the HQoS scheduling tree further includes a branch node in addition to the root node and the leaf node, the processing apparatus may determine a traffic characteristic of the at least one branch node based on the traffic characteristics of the plurality of queues, then determine a scheduling parameter of the at least one branch node based on the traffic characteristic of the at least one branch node and the scheduling parameter of the root node, and at last, determine the scheduling parameter of the at least one queue in the plurality of queues based on the traffic characteristics of the plurality of queues and the scheduling parameter of the at least one branch node. The scheduling parameter of the branch node may be an output rate of a "virtual token bucket" corresponding to the branch node.

For example, it is assumed that a total interface bandwidth corresponding to the root node is 100 G, and the root node corresponds to two branch nodes, respectively, a branch node 1 and a branch node 2. The branch node 1 corresponds to three leaf nodes, respectively corresponding to a queue 1, a queue 2, and a queue 3, the branch node 2 corresponds to one leaf node, and the leaf node corresponds to a queue 4. In addition, an input rate of the queue 1 is 20 Gbps, an input rate of the queue 2 is 40 Gbps, an input rate of the queue 3 is 30 Gbps, and an input rate of the queue 4 is 20 Gbps. A priority of the queue 1 is a high priority, and priorities of the queue 2 and the queue 3 are low priorities. Weights of the queue 2 and the queue 3 are respectively 70% and 30%. Therefore, the processing apparatus obtains an input rate 90 Gbps of the branch node 1 based on a sum of the input rate of the queue 3 and a sum of the input rate of the queue 1 and the input rate of the queue 2, and determines an input rate 20 Gbps of the branch node 2 based on the input rate of the queue 4. A weight of the branch node 1 is 70%, and a weight of the branch node 2 is 30%. Therefore, the processing apparatus determines, based on the weight of the branch node 1 and the weight of the branch node 2, and the total interface bandwidth corresponding to the root node, that a bandwidth allocated to the branch node 1 is 70 G, and a bandwidth allocated to the branch node 2 is 30 G. Because the priority of the queue 1 is a high priority, the input rate of the queue 1 may be determined as an output rate of the queue 1, that is, 20 Gbps. Therefore, the queue 2 and the queue 3 totally take up a bandwidth of 50 G. Based on the weights of the queue 2 and the queue 3, an output rate of the queue 2 is 30 Gbps, and an output rate of the queue 3 is 15 Gbps. For the branch node 2, because there is only one queue, namely, the queue 4, and the input rate of the queue 4 is less than the bandwidth allocated to the branch node 2, an output rate of the queue 4 is equal to the input rate of the queue 4, that is, 20 Gbps.

Specifically, when determining the traffic characteristic of the at least one branch node based on the traffic characteristics of the plurality of queues, the processing apparatus may determine an identifier of the corresponding branch node based on the queue identifiers of the plurality of queues and the mapping relationship, and then determine the traffic characteristic of the corresponding branch node based on the traffic characteristics of the plurality of queues, to obtain the traffic characteristic of the branch node corresponding to the identifier of the branch node. When the traffic characteristic includes an ingress rate, determining the traffic characteristic of the corresponding branch node based on the traffic characteristics of the plurality of queues may be obtaining the ingress rate of the branch node based on a sum of ingress rates of the plurality of queues.

For example, after obtaining respective ingress rates of the queue 40, the queue 41, and the queue 42, the processing apparatus learns, based on respective queue identifiers of the three queues and mapping relationships between the respective queue identifiers of the three queues and an identifier of the branch node 30, that the three queues belong to a same branch node, namely, the branch node 30, and then obtains, based on a sum of the ingress rates of the queue 40, the queue 41, and the queue 42, an ingress rate corresponding to the identifier of the branch node 30, namely, an ingress rate of the branch node 30.

When determining the scheduling parameter of the at least one branch node based on the traffic characteristic of the at least one branch node and the scheduling parameter of the root node, the processing apparatus may determine an identifier of the root node based on the identifier of the at least one branch node and a mapping relationship between the identifier of the at least one branch node and the identifier of the root node, obtain the scheduling parameter of the root node based on the identifier of the root node, and then determine the scheduling parameter of the at least one branch node based on the traffic characteristic corresponding to the identifier of the at least one branch node and the scheduling parameter of the root node.

For example, after obtaining the ingress rates of the branch node 30 and the branch node 31, the processing apparatus determines, based on the identifier of the branch node 30, the identifier of the branch node 31, a mapping relationship between the identifier of the branch node 30 and the branch node 20, and a mapping relationship between the identifier of the branch node 31 and the branch node 20, an ingress rate of the branch node 20 corresponding to the identifier of the branch node 20. After obtaining the ingress rate of the branch node 32, the processing apparatus determines, based on a mapping relationship between the identifier of the branch node 32 and an identifier of the branch node 21, an ingress rate corresponding to the identifier of the branch node 21, namely, an ingress rate of the branch node 21. The ingress rate of the branch node 21 and the ingress rate of the branch node 32 are the same. After obtaining the ingress rate corresponding to the identifier of the branch node 20 and the ingress rate corresponding to the identifier of the branch node 21, the processing apparatus obtains the identifier of the root node 10 based on a mapping relationship between the identifier of the branch node 20 and the identifier of the root node 10, and a mapping relationship between the identifier of the branch node 21 and the identifier of the root node 10, and obtains the scheduling parameter of the root node based on the identifier of the root node 10.

Then, the processing apparatus obtains a scheduling parameter of the branch node 20 and a scheduling parameter of the branch node 21 based on the ingress rate and a characteristic parameter that correspond to the identifier of the branch node 20, the ingress rate and a characteristic parameter that correspond to the identifier of the branch node 21, and the scheduling parameter of the root node. Subsequently, the processing apparatus obtains a scheduling parameter of the branch node 30 and a scheduling parameter of the branch node 31 based on the ingress rate and a characteristic parameter that correspond to the identifier of the branch node 30, the ingress rate and a characteristic parameter that correspond to the identifier of the branch node 31, and the scheduling parameter of the branch node 20. Similarly, the processing apparatus obtains a scheduling parameter of the branch node 32 based on the ingress rate and the characteristic parameter that correspond to the identifier of the branch node 21 and the scheduling parameter of the branch node 21.

At last, the processing apparatus obtains scheduling parameters of the queue 40, the queue 41, and the queue 42 based on an ingress rate and a characteristic parameter that correspond to an identifier of the queue 40, an ingress rate and a characteristic parameter that correspond to an identifier of the queue 41, an ingress rate and a characteristic parameter that correspond to an identifier of the queue 42, and the scheduling parameter of the branch node 30. This is similar for other queues. Details are not described herein.

S104: The processing apparatus sends a scheduling message to a scheduling apparatus corresponding to the at least one queue in the TM hardware entity. The scheduling message includes the scheduling parameter, and the scheduling parameter is used to schedule a queue corresponding to the leaf node.

After determining the scheduling parameter of the queue, the processing apparatus may deliver the scheduling message including the scheduling parameter to the scheduling apparatus in the TM hardware entity, so that the scheduling apparatus schedules the corresponding queue based on the scheduling parameter.

In addition, it should be noted that in this embodiment of this application, the processing apparatus may determine a scheduling parameter of each queue in the plurality of queues according to S103, determine scheduling parameters of one or more queues in which data flows are transmitted and that are in the plurality of queues, or determine scheduling parameters of one or more queues in which scheduling parameters change and that are in the plurality of queues. Compared with the first manner, in the two latter manners, a quantity of scheduling messages delivered by the processing apparatus can be reduced, and processing resources of the processing apparatus can be reduced.

S105: The scheduling apparatus receives the scheduling message and schedules, based on the scheduling parameter, the queue corresponding to the leaf node.

In this embodiment of this application, the HQoS scheduling tree is implemented by software. In other words, a mapping relationship between identifiers of nodes is generated, and the traffic characteristics of the plurality of queues are obtained, and the scheduling parameter of the queue is obtained based on the mapping relationship and the traffic characteristics of the plurality of queues. When the mapping relationship is to be changed, the TM hardware entity does not need to be replaced. Provided that the processing apparatus obtains a new mapping relationship through configuration, controller delivery, or the like, the queue can be flexibly managed, an actual transmission requirement can be met, and scheduling resources can be reduced.

Figure 4:
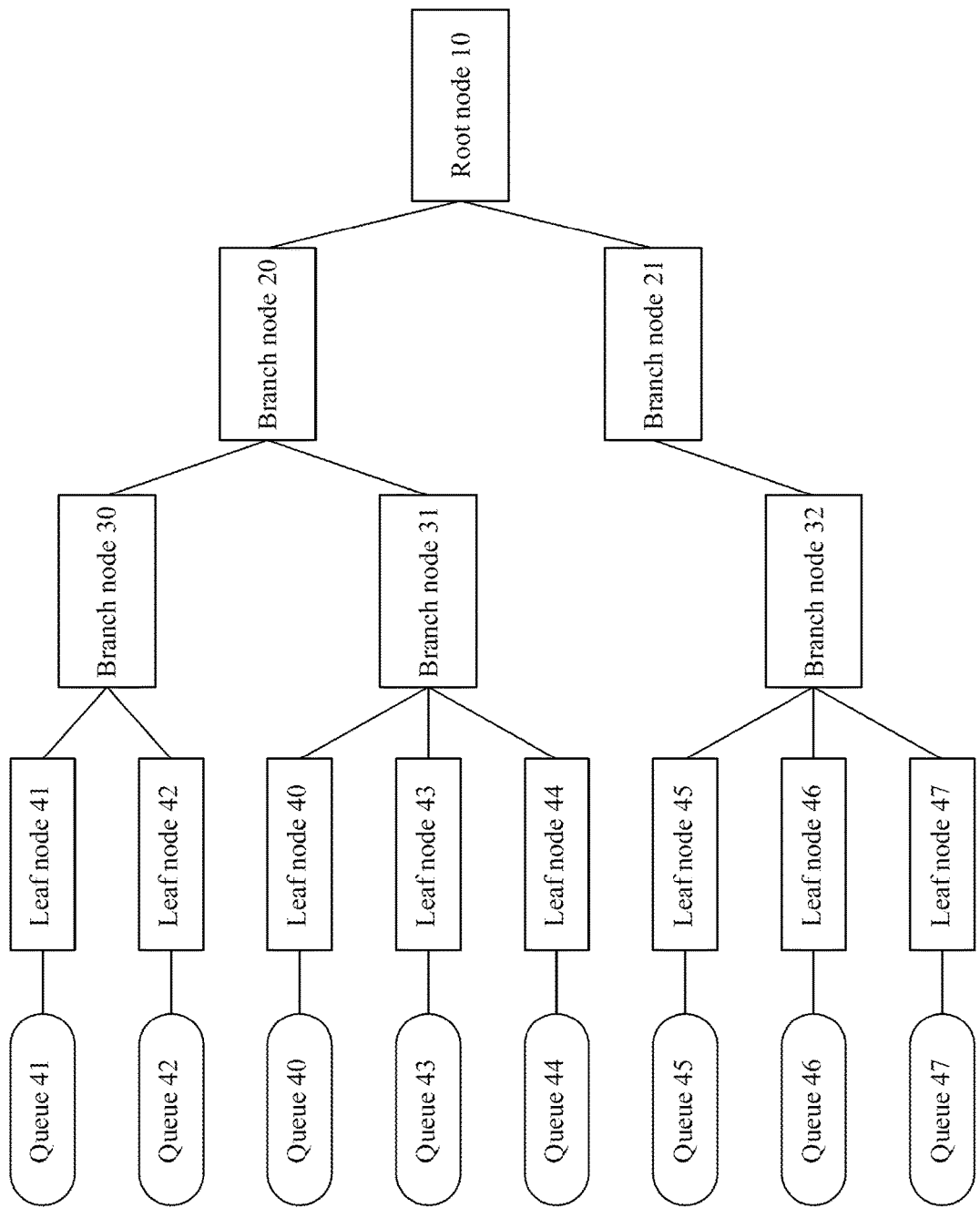
FIG. 4 is another schematic diagram of an HQoS scheduling tree according to an embodiment of this application.

For example, assuming that in FIG. 1, a user 1 corresponding to the branch node 30 no longer needs a service 1 corresponding to the leaf node 40, and a user 2 corresponding to the branch node 31 needs to add a new service, namely, a service 6, an HQoS scheduling tree shown in FIG. 1 may be modified into an HQoS scheduling tree shown in FIG. 4. In other words, a mapping relationship between the identifier of the branch node 30 and the identifier of the queue 40 is modified to a mapping relationship between the identifier of the branch node 31 and the identifier of the queue 40. After modification is completed, the processing apparatus may obtain, based on the identifier of the queue 40, a traffic characteristic of a data flow belonging to a service 6 of the user 1, obtain, based on the traffic characteristic of the queue 40, a scheduling parameter of a scheduling apparatus corresponding to the queue 40, and deliver the scheduling parameter to the scheduling apparatus, to schedule the queue 40, thereby scheduling the corresponding queue based on a new HQoS scheduling tree. In the entire process, the TM hardware entity does not need to be replaced, so that a new traffic transmission requirement can be met, queue management flexibility can be improved, and scheduling resources can be reduced.

Figure 5:
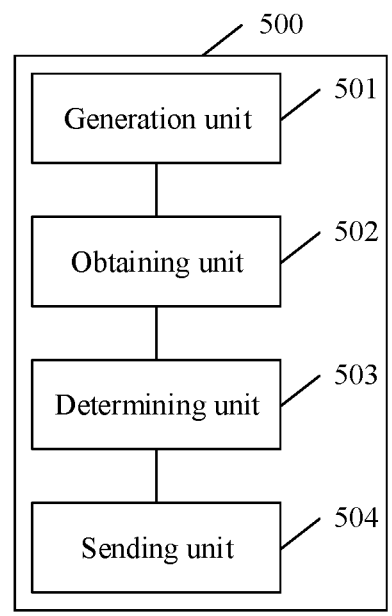
FIG. 5 is a schematic diagram of a structure of a processing apparatus 500 according to an embodiment of this application.

Refer to FIG. 5. An embodiment of this application further provides a processing apparatus 500. The processing apparatus 500 may implement functions of the processing apparatus in the embodiment shown in FIG. 3. The apparatus 500 includes a generation unit 501, and obtaining unit 502, a determining unit 503, and a sending unit 504. The generation unit 501 is configured to perform S101 in the embodiment shown in FIG. 3. The obtaining unit 502 is configured to perform S102 in the embodiment shown in FIG. 3. The determining unit 503 is configured to perform the S103 in the embodiment shown in FIG. 3. The sending unit 504 is configured to perform S104 in the embodiment shown in FIG. 3.

Specifically, the generation unit 501 is configured to generate a hierarchical quality of service HQoS scheduling tree. The HQoS scheduling tree is used to describe a tree structure of a node participating in scheduling in a communication network, the HQoS scheduling tree includes a plurality of leaf nodes, each of the plurality of leaf nodes is used to identify a queue on a traffic management TM hardware entity, the TM hardware entity includes a plurality of queues, and the plurality of leaf nodes and the plurality of queues are in a one-to-one correspondence.

The obtaining unit 502 is configured to obtain traffic characteristics of the plurality of queues based on the plurality of leaf nodes.

The determining unit 503 is configured to determine a scheduling parameter of at least one queue in the plurality of queues based on the traffic characteristics of the plurality of queues. The traffic characteristics of the plurality of queues are traffic characteristics of data flows transmitted by the plurality of queues.

The sending unit 504 is configured to send a scheduling message to a scheduling apparatus corresponding to the at least one queue in the TM hardware entity. The scheduling message includes the scheduling parameter, and the scheduling parameter is used to schedule a queue corresponding to the leaf node.

Refer to the foregoing method embodiments for specific execution steps of the units in the processing apparatus 500. Details are not described again herein.

Figure 6:
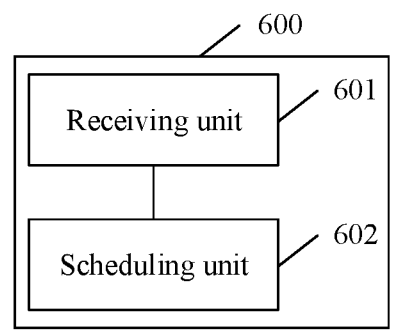
FIG. 6 is a schematic diagram of a structure of a scheduling apparatus 600 according to an embodiment of this application.

Refer to FIG. 6. An embodiment of this application further provides a scheduling apparatus 600. The scheduling apparatus 600 may implement functions of the scheduling apparatus in the embodiment shown in FIG. 3. The scheduling apparatus 600 includes a receiving unit 601 and a scheduling unit 602. The receiving unit 601 and the scheduling unit 602 are configured to perform S105 in the embodiment shown in FIG. 3.

Specifically, the receiving unit 601 is configured to receive a scheduling message from a processing apparatus. The scheduling message includes a scheduling parameter of at least one queue in a plurality of queues, and the TM hardware entity does not include a processing apparatus.

The scheduling unit 602 is configured to schedule the at least one queue based on the scheduling parameter of the at least one queue.

Refer to the foregoing method embodiments for specific execution steps of the units in the scheduling apparatus 600. Details are not described again herein.

Figure 7:
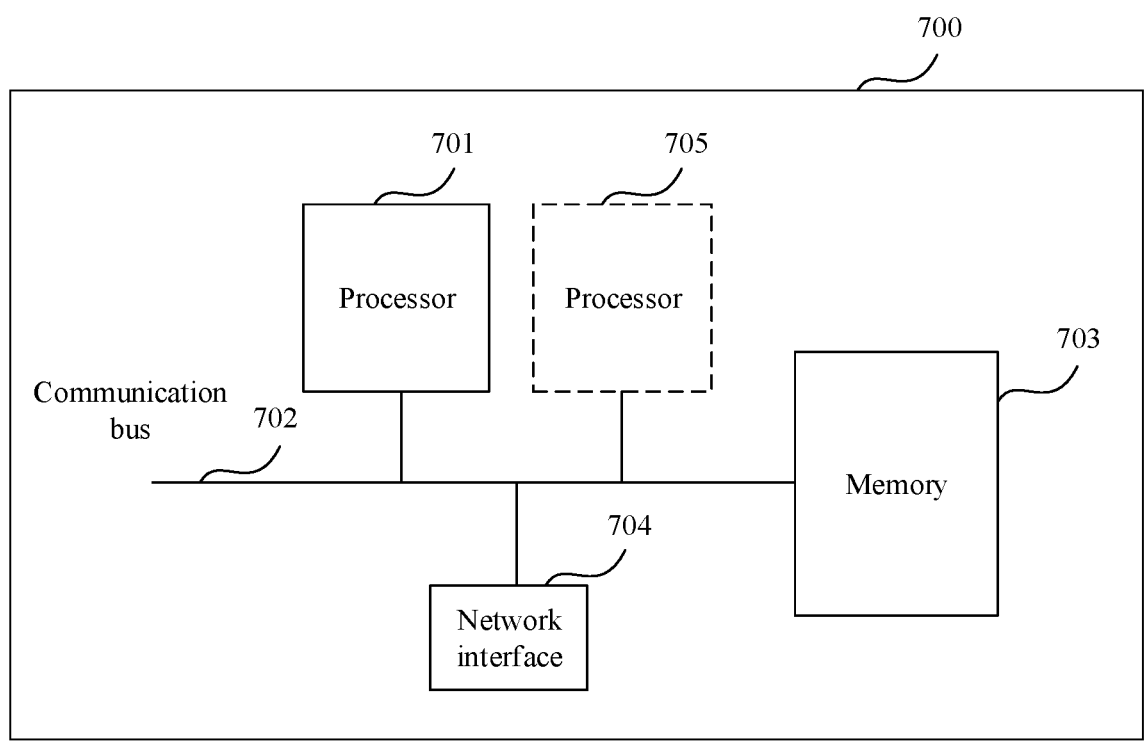
FIG. 7 is a schematic diagram of a structure of a device 700 according to an embodiment of this application.

FIG. 7 is a schematic diagram of a structure of a device 700 according to an embodiment of this application. The processing apparatus 500 in FIG. 5 and the scheduling apparatus 600 in FIG. 6 may be implemented by the device shown in FIG. 7. Refer to FIG. 7. The device 700 includes at least one processor 701, a communication bus 702, and at least one network interface 704. Optionally, the device 700 may further include a memory 703.

The processor 701 may be a general central processing unit (CPU), an application-specific integrated circuit (ASIC), or one or more integrated circuits (IC) configured to control program execution of the solutions in this application. The processor may be configured to implement the queue scheduling method provided in the embodiments of this application.

For example, when the processing apparatus in FIG. 3 is implemented by using the device shown in FIG. 7, the device may be configured to: generate an HQoS scheduling tree; after generating the HQoS scheduling tree, obtain traffic characteristics of a plurality of queues based on a plurality of leaf nodes; determine a scheduling parameter of at least one queue in the plurality of queues based on the traffic characteristics of the plurality of queues; and send a scheduling message to a scheduling apparatus corresponding to the at least one queue in the TM hardware entity. For implementation of specific functions, refer to a processing part corresponding to the processing apparatus in the method embodiment. For another example, when the scheduling apparatus in FIG. 3 is implemented by the device shown in FIG. 7, the device may be configured to: receive a scheduling message from a processing apparatus, where the scheduling message includes a scheduling parameter of at least one queue in the plurality of queues; and schedule the at least one queue based on a scheduling parameter of the at least one queue. For implementation of specific functions, refer to a processing part of the scheduling apparatus in the method embodiment.

The communication bus 702 is configured to transfer information between the processor 701, the network interface 704, and the memory 703.

The memory 703 may be a read-only memory (ROM) or another type of static storage device that can store static information and instructions. The memory 703 may alternatively be a random access memory (RAM) or another type of dynamic storage device that can store information and instructions. The memory 703 may alternatively be a compact disc read-only memory (CD-ROM) or another compact disc storage, an optical disc storage (including a compact disc, a laser disc, an optical disc, a digital versatile disc, a Blu-ray disc, or the like), or a magnetic disk storage medium or another magnetic storage device, or any other medium that can be used to carry or store expected program code in an instruction form or a data structure form and that can be accessed by a computer. However, the memory 703 is not limited thereto. The memory 703 may exist independently and is connected to the processor 701 through the communication bus 702. Alternatively, the memory 703 may be integrated with the processor 701.

Optionally, the memory 703 is configured to store program code or instructions for performing the solutions in this application, and the processor 701 controls execution of the program code or instructions. The processor 701 is configured to execute the program code or instructions stored in the memory 703. The program code may include one or more software modules. Optionally, the processor 701 may alternatively store the program code or instructions for performing the solutions in this application. In this case, the processor 701 does not need to read the program code or instructions from the memory 703.

The network interface 704 may be an apparatus, for example, a transceiver, and is configured to communicate with another device or a communication network. The communication network may be an Ethernet, a radio access network (RAN), or a wireless local area network (WLAN). In this embodiment of this application, the network interface 704 may be configured to receive a packet sent by another node in a segment routing network or sent a packet to another node in a segment routing network. The network interface 704 may be an Ethernet interface, a fast Ethernet (FE) interface, a gigabit Ethernet (GE) interface, or the like.

In a specific implementation, in an embodiment, the device 700 may include a plurality of processors, for example, a processor 701 and a processor 405 shown in FIG. 7. Each of the processors may be a single-core (single-CPU) processor or a multi-core (multi-CPU) processor. Herein, the processor may be one or more devices, circuits, and/or processing cores configured to process data (for example, computer program instructions).

Figure 8:
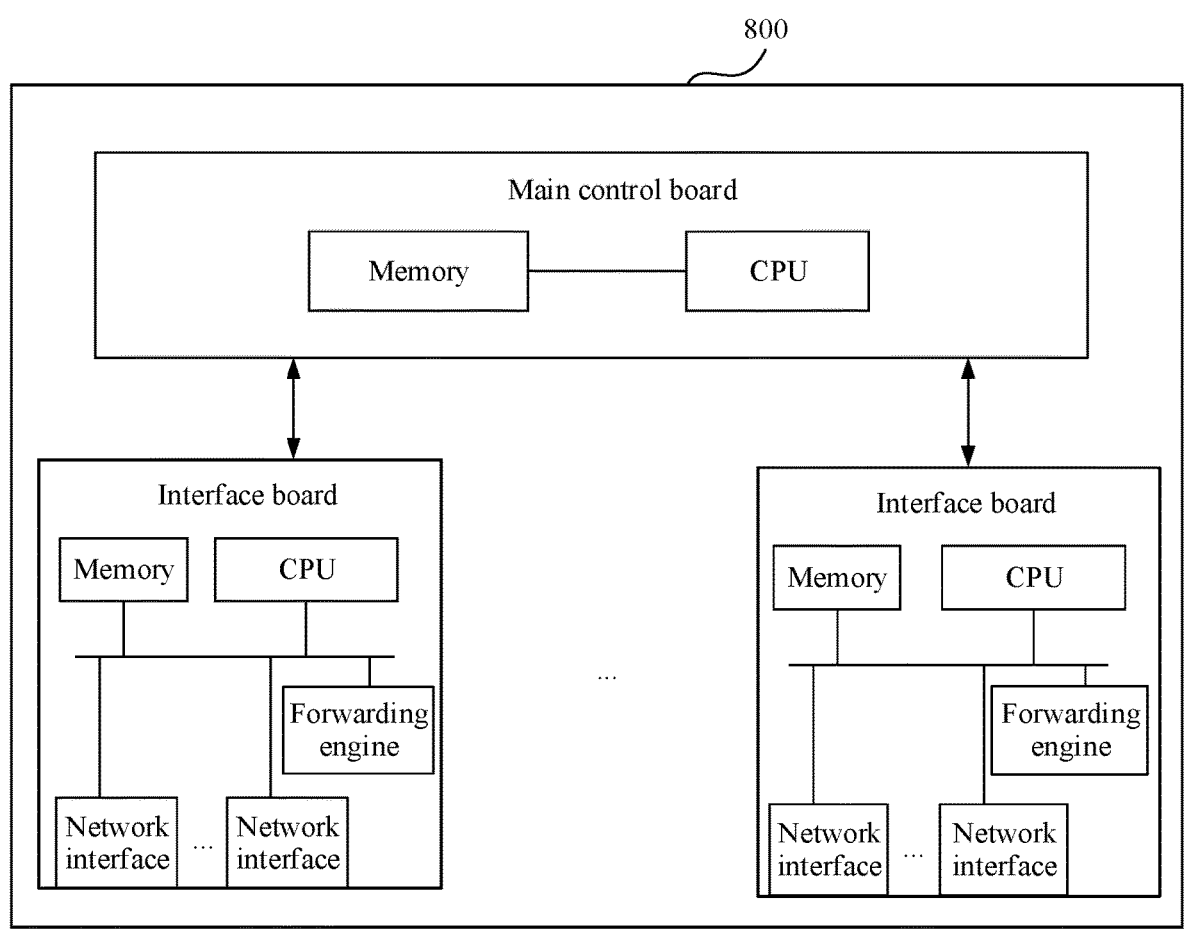
FIG. 8 is a schematic diagram of a structure of a device 800 according to an embodiment of this application.

FIG. 8 is a schematic diagram of a structure of a device 800 according to an embodiment of this application. The processing apparatus and the scheduling apparatus in FIG. 3 may be implemented by the device shown in FIG. 8. Refer to the schematic diagram of the structure of the device shown in FIG. 8. The device 800 includes a main control board and one or more interface boards. The main control board is in communication connection with the interface boards. The main control board is also referred to as a main processing unit (MPU) or a route processor card. The main control board includes a CPU and a memory. The main control board is responsible for controlling and managing components in the device 800, including executing route calculation and device management and maintenance functions. The interface board is also referred to as a line processing unit (LPU) or a line card, configured to receive and send a packet. In some embodiments, the interface boards or the main control board and the interface boards communicate with each other by using a bus. In some embodiments, the interface boards communicate with each other by using a switching board. In this case, the device 800 also includes a switching board. The switching board, the main control board, and the interface boards are in communication connection. The switching board is configured to forward data between the interface boards. The switching board may also be referred to as a switch fabric unit (SFU). The interface board includes a CPU, a memory, a forwarding engine, and an interface card (IC). The interface card may include one or more network interfaces. The network interface may be an Ethernet interface, an FE interface, a GE interface, or the like. The CPU is in communication connection with the memory, the forwarding engine, and the interface card. The memory is configured to store a forwarding table. The forwarding engine is configured to forward a received packet based on the forwarding table stored in the memory. If a destination address of the received packet is an IP address of the device 800, the packet is sent to a CPU of the main control board or the interface board for processing. If the destination address of the received packet is not the IP address of the device 800, the forwarding table is looked up based on the destination address. If a next hop and an outbound interface that correspond to the destination address are found in the forwarding table, the packet is forwarded to the outbound interface corresponding to the destination address. The forwarding engine may be a network processor (NP). The interface card is also referred to as a subcard, may be mounted on the interface board, and is responsible for converting a photoelectric signal into a data frame, performing validity check on the data frame, and then forwarding the data frame to the forwarding engine for processing or the CPU of the interface board. In some embodiments, the CPU may also execute functions of the forwarding engine, for example, implementing soft forwarding based on a general CPU, so that the interface board does not need the forwarding engine. In some embodiments, the forwarding engine may be implemented by using an ASIC or a field programmable gate array (FPGA). In some embodiments, the memory storing the forwarding table may also be integrated into the forwarding engine as a part of the forwarding engine.

An embodiment of this application further provides a chip system, including: a processor. The processor is coupled to a memory. The memory is configured to store a program or instructions. When the program or the instructions are executed by the processor, the chip system is caused to implement the method of the processing apparatus or the scheduling apparatus in the embodiment shown in FIG. 3.

Optionally, there may be one or more processors in the chip system. The processor may be implemented by using hardware, or may be implemented by using software. When the processor is implemented by the hardware, the processor may be a logic circuit, an integrated circuit, or the like. When the processor is implemented by using the software, the processor may be a general-purpose processor, and is implemented by reading software code stored in the memory.

Optionally, there may be one or more memories in the chip system. The memory may be integrated with the processor or the memory and the processor may be separately set. This is not limited in this application. For example, the memory may be a non-transitory processor, for example, a read-only memory ROM. The memory and the processor may be integrated into a same chip, or may be separately disposed on different chips. A type of the memory and a manner of disposing the memory and the processor are not specifically limited in this application.

For example, the chip system may be an FPGA, an ASIC, a system on chip (SoC), a CPU, an NP, a digital signal processing circuit (digital signal processor, DSP), a micro controller (micro controller unit, MCU), a programmable controller (programmable logic device, PLD), or another integrated chip.

It should be noted that the steps of the method embodiment can be completed by using an integrated logic circuit in hardware of the processor or instructions in a software form. The steps of the method disclosed with reference to embodiments of this application may be directly performed by a hardware processor, or may be performed by a combination of hardware and software modules in the processor.

In addition, an embodiment of this application further provides a queue scheduling system, including the processing apparatus 500 in the embodiment shown in FIG. 5 and the scheduling apparatus 600 in the embodiment shown in FIG. 6.

An embodiment of this application further provides a computer-readable storage medium, including instructions. When the instructions are run on a computer, the computer is enabled to perform the method in the embodiment.

In this specification, the claims, and the accompanying drawings of this application, terms "first", "second", "third", "fourth", and the like are intended to distinguish between similar objects but do not necessarily indicate a specific order or sequence. It should be understood that the data used in such a way are interchangeable in appropriate circumstances, so that embodiments described herein can be implemented in an order other than the content illustrated or described herein. In addition, terms such as "include", "have", and any variations thereof are intended to cover non-exclusive inclusions. For example, a process, method, system, product, or device that includes a series of steps or units is not necessarily limited to those clearly listed steps or units, but may include other steps or units that are not clearly listed or inherent to such a process, method, product, or device.

In this application, "at least one" means one or more, and "a plurality of" means two or more. "At least one of the following items (pieces)" or a similar expression thereof refers to any combination of these items, including any combination of singular items (pieces) or plural items (pieces). For example, at least one item (piece) of a, b, and c may indicate: a, b, c, a and b, a and c, b and c, or a, b, and c, where a, b, and c may be singular or plural. It is considered in this application that "A and/or B" includes A alone, B alone, and both A and B.

It may be clearly understood by persons skilled in the art that, for the purpose of convenient and brief description, for a detailed working process of the foregoing system, apparatus, and unit, refer to a corresponding process in the foregoing method embodiment. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the current technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in embodiments of this application. The storage medium includes any medium that can store program code, such as a USB flash drive, a removable hard disk, a read-only memory (ROM), a random access memory (RAM), a magnetic disk, or an optical disc.

Persons skilled in the art should be aware that in the foregoing one or more examples, functions described in the present invention may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communication medium. The communication medium includes any medium that facilitates transmission of a computer program from one place to another. The storage medium may be any available medium accessible to a general-purpose or a special-purpose computer.

The specific implementations further describe the purpose of the present invention, the technical solutions, and beneficial effects in detail. It should be understood that the foregoing content is merely specific implementations of the present invention.

In conclusion, the foregoing embodiments are merely intended for describing the technical solutions of this application, but not for limiting this application. Although this application is described in detail with reference to the foregoing embodiments, persons of ordinary skill in the art should understand that modifications to the technical solutions recorded in the foregoing embodiments or equivalent replacements to some technical features thereof may still be made, without departing from the scope of the technical solutions of embodiments of this application.

What is claimed is:

1. A queue scheduling method comprising:
generating, by a processing apparatus, a hierarchical quality of service (HQoS) scheduling tree, wherein the HQOS scheduling tree is used to describe a tree structure of a node participating in scheduling in a communication network, the HQOS scheduling tree comprises a plurality of leaf nodes, a root node and at least one branch node corresponding to the root node,
wherein each of the plurality of leaf nodes is used to identify a queue on a traffic management (TM) hardware entity,
wherein each of the at least one branch node corresponds to one or more leaf nodes, and different branch nodes correspond to different leaf nodes,
wherein the TM hardware entity comprises a plurality of queues, and the plurality of leaf nodes and the plurality of queues are in a one-to-one correspondence;
obtaining, by the processing apparatus, traffic characteristics of the plurality of queues based on the plurality of leaf nodes;
determining, by the processing apparatus, a scheduling parameter of at least one queue in the plurality of queues based on the traffic characteristics of the plurality of queues, including:
determining, a traffic characteristic of the at least one branch node based on the traffic characteristics of the plurality of queues;
determining, a scheduling parameter of the at least one branch node based on the traffic characteristic of the at least one branch node and a scheduling parameter of the root node; and
determining, the scheduling parameter of the at least one queue in the plurality of queues based on the traffic characteristics of the plurality of queues and the scheduling parameter of the at least one branch node;
wherein the traffic characteristics of the plurality of queues are traffic characteristics of data flows transmitted by the plurality of queues; and
sending, by the processing apparatus, a scheduling message to a scheduling apparatus corresponding to the at least one queue in the TM hardware entity, wherein the scheduling message comprises the scheduling parameter of the at least one queue, and the scheduling parameter is used to schedule the at least one queue.

2. The method according to claim 1, wherein the HQoS scheduling tree further comprises a root node of the plurality of leaf nodes; and
wherein the determining, by the processing apparatus, the scheduling parameter of the at least one queue in the plurality of queues based on the traffic characteristics of the plurality of queues comprises:
determining, by the processing apparatus, the scheduling parameter of the at least one queue in the plurality of queues based on the traffic characteristics of the plurality of queues and a scheduling parameter of the root node.

3. The method according to claim 1, wherein the traffic characteristic comprises an input rate and a queue identifier; and
wherein the determining, by the processing apparatus, the scheduling parameter of the at least one queue in the plurality of queues based on the traffic characteristics of the plurality of queues comprises:
determining, by the processing apparatus, characteristic parameters of the plurality of queues based on the queue identifiers of the plurality of queues, wherein the characteristic parameter comprises at least one of a priority and a weight; and
determining, by the processing apparatus, the scheduling parameter of the at least one queue in the plurality of queues based on input rates and the characteristic parameters of the plurality of queues.

4. The method according to claim 1, wherein the scheduling apparatus is a token bucket, and the scheduling parameter is a rate at which the token bucket outputs a token.

5. The method according to claim 1, wherein the TM hardware entity is an application-specific integrated circuit (ASIC) chip or a programmable logical controller (PLC).

6. The method according to claim 1, wherein the processing apparatus and the TM hardware entity belong to a same network device.

7. A non-transitory computer-readable storage medium, comprising instructions, wherein when the instructions are run on a computer, the computer is enabled to perform the queue scheduling method according to claim 1.

8. The non-transitory computer-readable storage medium according to claim 7, wherein the processing apparatus and the TM hardware entity belong to a same network device.

9. A queue scheduling method, wherein the method is applied to a scheduling apparatus of a traffic management (TM) hardware entity, the TM hardware entity further comprises a plurality of queues, and the method comprises:
   receiving, by the scheduling apparatus, a scheduling message from a processing apparatus, wherein the scheduling message comprises a scheduling parameter of at least one queue in the plurality of queues, and the TM hardware entity does not comprise the processing apparatus;
   scheduling, by the scheduling apparatus, the at least one queue based on the scheduling parameter of the at least one queue;
   wherein the scheduling parameter is determined based on traffic characteristics of the plurality of queues and a scheduling parameter of at least one branch node; wherein the scheduling parameter of the at least one branch node is determined based on traffic characteristic of the at least one branch node and a scheduling parameter of a root node; wherein the traffic characteristic of the at least one branch node is determined based on the traffic characteristics of the plurality of queues;
   wherein the root node and the at least one branch node corresponding to the root node are comprised in a hierarchical quality of service (HQoS) scheduling tree generated by the processing apparatus; and wherein each of the at least one branch node corresponds to one or more leaf nodes of the HQOS scheduling tree, and different branch nodes correspond to different leaf nodes.

10. The method according to claim 9, wherein the processing apparatus and the TM hardware entity belong to a same network device.

11. The method according to claim 9, wherein the scheduling apparatus is a token bucket, and the scheduling parameter is a rate at which the token bucket outputs a token.

12. The method according to claim 9, wherein the TM hardware entity is an application-specific integrated circuit (ASIC) chip or a programmable logical controller (PLC).

13. A processing apparatus comprising:
   a memory comprising processor-executable instructions; and
   a processor in communication with the memory, wherein the processor is configured to execute the processor-executable instructions to facilitate the processing apparatus to:
   generate a hierarchical quality of service (HQOS) scheduling tree, wherein the HQOS scheduling tree is used to describe a tree structure of a node participating in scheduling in a communication network, the HQOS scheduling tree comprises a plurality of leaf nodes, a root node and at least one branch node corresponding to the root node,
   wherein each of the plurality of leaf nodes is used to identify a queue on a traffic management (TM) hardware entity,
   wherein each of the at least one branch node corresponds to one or more leaf nodes, and different branch nodes correspond to different leaf nodes,
   wherein the TM hardware entity comprises a plurality of queues, and the plurality of leaf nodes and the plurality of queues are in a one-to-one correspondence;
   obtain traffic characteristics of the plurality of queues based on the plurality of leaf nodes;
   determine a scheduling parameter of at least one queue in the plurality of queues based on the traffic characteristics of the plurality of queues, including:
      determining, a traffic characteristic of the at least one branch node based on the traffic characteristics of the plurality of queues;
      determining, a scheduling parameter of the at least one branch node based on the traffic characteristic of the at least one branch node and a scheduling parameter of the root node; and
      determining, the scheduling parameter of the at least one queue in the plurality of queues based on the traffic characteristics of the plurality of queues and the scheduling parameter of the at least one branch node;
   wherein the traffic characteristics of the plurality of queues are traffic characteristics of data flows transmitted by the plurality of queues; and
   send a scheduling message to a scheduling apparatus corresponding to the at least one queue in the TM hardware entity, wherein the scheduling message comprises the scheduling parameter of the at least one queue, and the scheduling parameter is used to schedule the at least one queue.

14. The apparatus according to claim 13, wherein the HQOS scheduling tree further comprises a root node of the plurality of leaf nodes; and
   wherein in determining the scheduling parameter of the at least one queue in the plurality of queues based on the traffic characteristics of the plurality of queues, the processor is further configured to execute the processor-executable instructions to facilitate the processing apparatus to:
   determine the scheduling parameter of the at least one queue in the plurality of queues based on the traffic characteristics of the plurality of queues and a scheduling parameter of the root node.

15. The apparatus according to claim 13, wherein the traffic characteristic comprises an input rate and a queue identifier; and
   wherein in determining the scheduling parameter of the at least one queue in the plurality of queues based on the traffic characteristics of the plurality of queues, the processor is further configured to execute the processor-executable instructions to facilitate the processing apparatus to:
   determine characteristic parameters of the plurality of queues based on the queue identifiers of the plurality of queues; and determine the scheduling parameter of the at least one queue in the plurality of queues based on input rates and the characteristic parameters of the plurality of queues, wherein the characteristic parameter comprises at least one of a priority and a weight.

16. The apparatus according to claim 13, wherein the scheduling apparatus is a token bucket, and the scheduling parameter is a rate at which the token bucket outputs a token.

17. The apparatus according to claim 13, wherein the TM hardware entity is an application-specific integrated circuit (ASIC) chip or a programmable logical controller (PLC).

18. The apparatus according to claim 13, wherein the processing apparatus and the TM hardware entity belong to a same network device.

19. A queue scheduling system, comprising the processing apparatus according to claim 13 and the scheduling apparatus, wherein the scheduling apparatus comprises:
a memory comprising processor-executable instructions; and
a processor in communication with the memory, wherein the processor is configured to execute the processor-executable instructions to facilitate the scheduling apparatus to:
receive the scheduling message from the processing apparatus, wherein the TM hardware entity does not comprise the processing apparatus; and
schedule the at least one queue based on the scheduling parameter of the at least one queue.

20. The queue scheduling system according to claim 19, wherein the processing apparatus and the TM hardware entity belong to a same network device.

* * * * *